Patented May 28, 1935

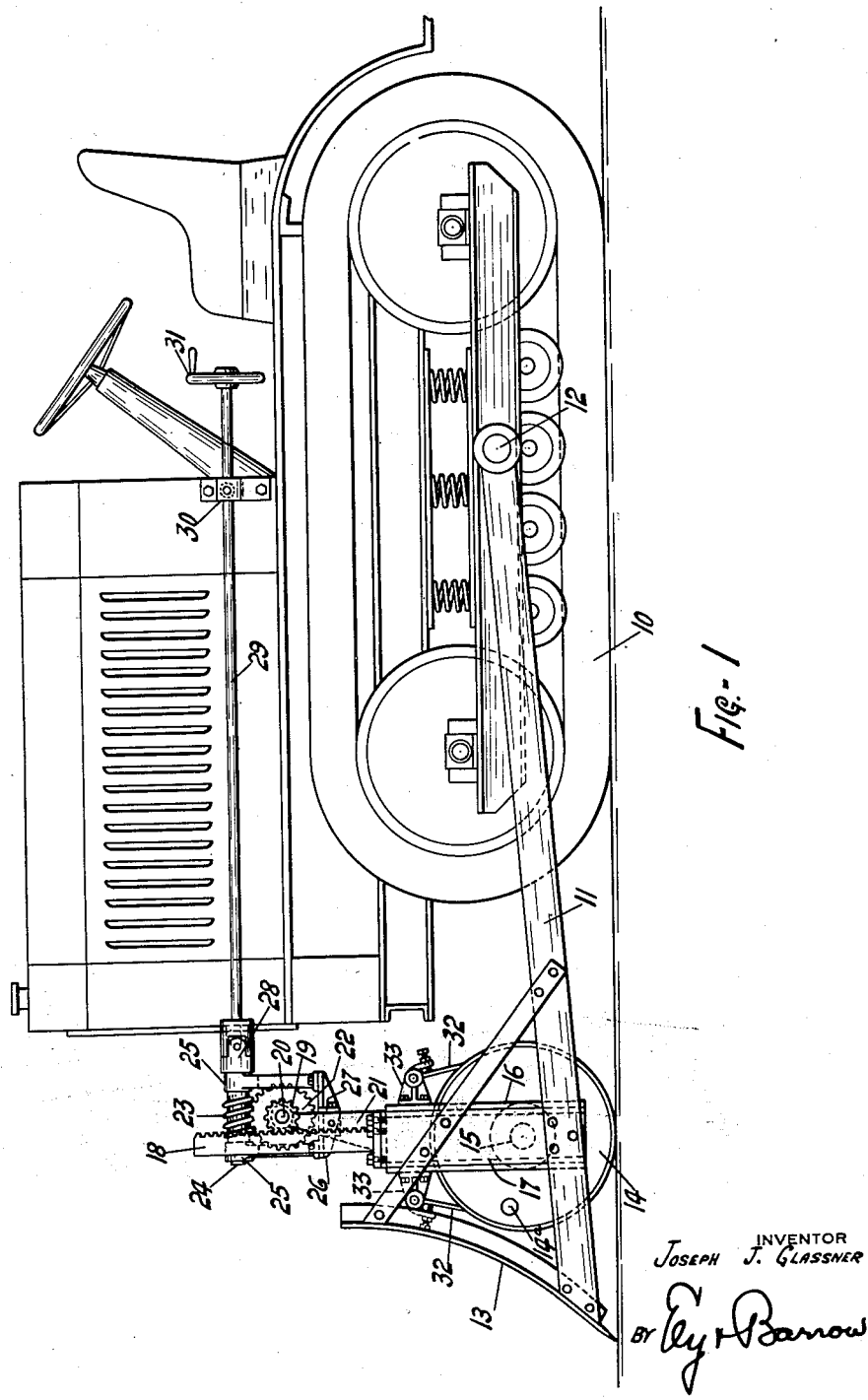

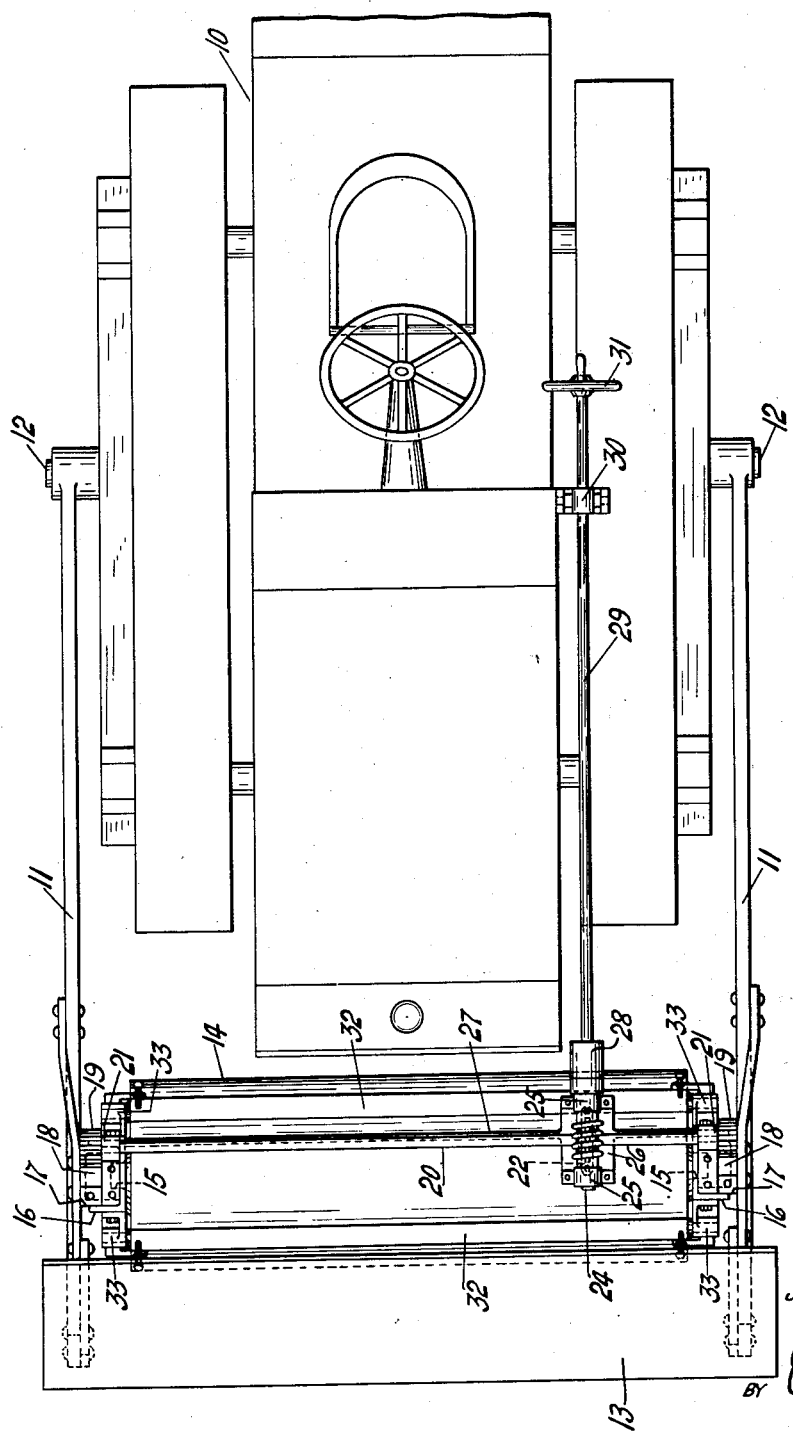

2,003,186

UNITED STATES PATENT OFFICE 2,003,186

SCRAPER

Joseph J. Glassner, Akron, Ohio, assignor of one-half to Bird C. Clutter, Akron, Ohio Application August 27, 1932, Serial No. 630,685

2 Claims. (Cl. 37—146)

This invention relates to power scrapers, bull dozers, or back fillers for use in excavating, road building and the like.

The general purpose of the invention is to provide a combined scraper and roller, the former of which is supported, preferably adjustably, upon the latter whereby not only is an improved scraper obtained but also the device will both scrape and compact a surface.

The foregoing and other purposes of the invention are attained in the device illustrated in the accompanying drawings and described below. It is to be understood that the invention is not limited to the specific form thereof shown and described.

Of the accompanying drawings,

Figure 1 is a side elevation of a scraper embodying the invention; and

Figure 2 is a plan view thereof.

Referring to the drawings, the numeral 10 designates a tractor on which may be pivoted a scraper frame 11 as at 12, 12 in the usual manner and which may be adapted to be lowered or raised to swing the scraper frame to and from an operative position by any suitable mechanical, hydraulic, pneumatic or electrical means (not shown) such as will be understood by the skilled artisan.

The frame 11 supports the usual scraper blade 13 at its forward end and the present invention consists in associating with said blade, preferably in a manner substantially as shown, a roller 14 which preferably is a compacting roller. This roller may be made as a hollow steel drum adapted to be filled through an opening closed by a plug or the like at 14ª with suitable weighting material such as water.

The roller 14 is preferably secured to the frame 11 just back of the scraper blade in a manner permitting adjustment of the latter relative thereto. To this end it may be journaled in bearings 15, 15 secured on vertical guides 16, 16 in which are slidably mounted respective slides 17, secured to the opposite sides of frame 11. To adjust the frame 11 relatively of roller 14, the slides 17 may have racks 18, 18 secured thereto with which mesh pinions 19, 19 secured on a transverse shaft 20 journaled in brackets 21, 21 which may be mounted on guides 16. Shaft 20 may be arranged to be rotated from the driver's seat in the tractor by means of a worm gear 22 secured to shaft 20, a worm 23 meshed with said worm gear and secured on a shaft 24 journaled in bearings 25, 25 on a bracket 26 which may be secured on a transverse bar 27 secured to brackets 21. Shaft 24 may be connected through a universal joint 28 to a shaft 29 journaled at 30 adjacent the driver's seat in a suitable swiveled bearing to permit swinging of shaft 29 in a vertical plane in unison with the frame 11, a hand wheel 31 or other suitable means being provided to turn shaft 29.

Scraper elements 32, 32 may be adjustably secured in any suitable way on brackets 33, 33 which may be fixed to the vertical guides 16 as shown to engage the surface of roller 14 to remove earth clinging to such surface.

In use, the scraper blade 13 is adjusted to the desired position by relative adjustment of the frame 11 and roller 14, i. e. by raising or lowering the frame on the roller, the latter supporting the scraper blade in adjusted position. By this construction rocking of the tractor in passing over uneven surfaces does not affect the depth of cut of the scraper blade. The scraper blade cannot rise or fall sharply nor drop suddenly over an edge or shoulder of an excavation. Moreover, the roller may be utilized to compact the scraped surface, this not only being of great value in road building but also in compacting earth back-filled into excavations. Numerous advantages of the improved construction will be apparent to the skilled artisans who have experienced many difficulties in the operation of prior forms of scrapers of this type.

Obviously modifications of the invention may be resorted to without departing from the spirit thereof or the scope of the appended claims.

What is claimed is:

1. The combination with an earth-working scraper including a tractor, of a frame pivotally mounted thereon, a scraper blade at the free end of the frame, aligned vertical slides secured to opposite sides of the frame immediately behind said blade, respective guides for said slides, a roller journaled on said guides, rack and pinion mechanism connected respectively to the slides and guides for effecting relative movement thereof, and means for operating said rack and pinion mechanism from the tractor, said means including a shaft having a swivelled support on the tractor.

2. A scraper comprising a tractor, a frame pivotally connected at one end thereto, a scraper blade at the opposite end of said frame, a roller for supporting the scraper frame on the surface to be scraped, said scraper being adjustable relatively of the roller, means comprising a worm and worm gear carried by the roller structure for so adjusting said scraper, and a shaft for said worm having a swivelled support on the tractor whereby the scraper may be adjusted from the driver's seat.

JOSEPH J. GLASSNER.